United States Patent Office 2,737,518
Patented Mar. 6, 1956

2,737,518

1-HYDROXYCORTISONE, 1-HYDROXYHYDRO-CORTISONE AND ESTERS THEREOF

Hershel L. Herzog, Mountain View, N. J., assignor to Schering Corporation, Bloomfield, N. J., a corporation of New Jersey No Drawing. Application January 19, 1955,
Serial No. 482,890

11 Claims. (Cl. 260—397.45)

I have discovered that 1-oxygenated cortical hormones are valuable intermediates for the preparation of 1,4-pregnadiene - 11β,17α,21-triol-3,20-dione and 1,4-pregnadiene - 17α,21 - diol-3,11,20-trione, powerful antiarthritic agents described in co-pending application, Serial No. 449,257, of Arthur Nobile, filed August 11, 1954.

The new compounds of the invention may be represented by the formula:

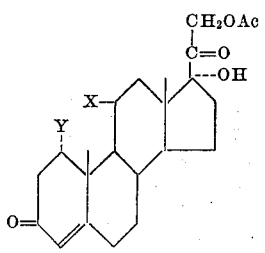

wherein X represents —OH or =O, Y represents —OH or —OAc and Ac represents a lower alkanoic acid radical.

The following is a typical sequence of reactions by which the new compounds of the invention may be made:

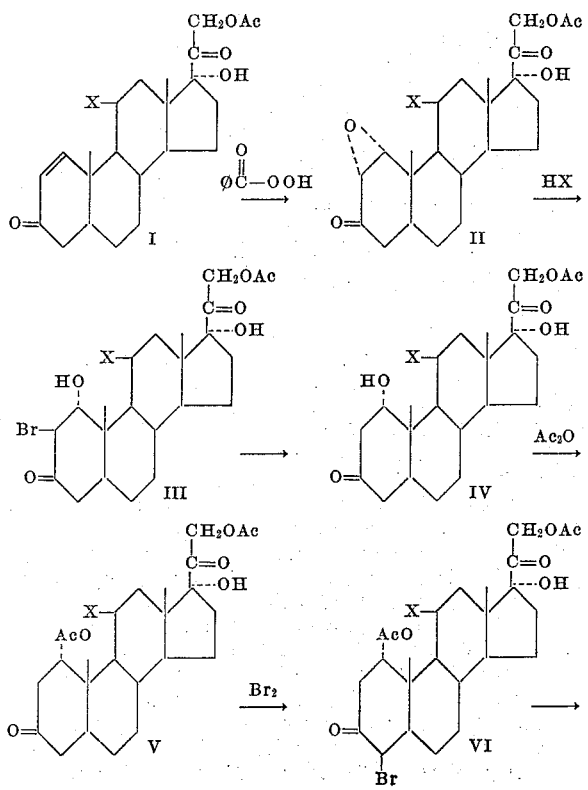

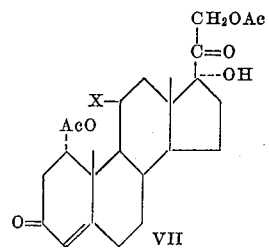

wherein X represents —OH or =O and Ac represents a lower alkanoic acid radical.

For example, in converting 1-pregnene-1α,21-diol-3,11,20-trione 21-acetate (Mattox and Kendall, J. B. C., 188, 287 (1957)) to 4-pregnene-1,17α,21-triol-3,11,20-trione and the corresponding 1,21-diacetate, the starting material (I) is expoxidized by means of one of the well known expoxidizers such as perbenzoic acid, monoperphthalic acid, peracetic acid, etc. Preferably perbenzoic acid or monoperphthalic acid in an inert medium such as chloroform or methylene chloride is used in this step. The product of epoxidation (II) is then treated with an anhydrous hydrohalic acid such as hydrogen bromide in chloroform, hydrogen iodide in glacial acetic acid, etc. The resultant halohydrin (III), preferably the iodohydrin, is then dehalogenated with Raney nickel in acetic acid, or with hydrogen and palladium-on-calcium carbonate catalyst to pregnane-1,17α,21-triol-3,11,20-trione (IV). Compound IV is acylated with a lower alkanoic acid anhydride or acid chloride, such as acetic anhydride, in pyridine solution to yield V. Alternatively, compound V may be prepared by reversing the order of the last two steps. Bromination and dehydrobromination of V affords the desired 4-pregnene-1,17α,21-triol-3,11,20-trione 1,21-diacetate. The bromination is preferably conducted with bromine, in the presence of sodium acetate to control the acidity. The dehydrobromination is most conveniently accomplished with the aid of semicarbazide. The resulting semi-carbazone is converted to VII by the action of pyruvic acid.

In similar fashion IV is convertible to 4-pregnene-1,17α,21-triol-3,11,20-trione 21-acetate (VIII) by omitting the acylation step. Bromination in the presence of sodium acetate followed by the same dehydrobromination procedure effects the desired transformation.

The corresponding 11β-hydroxy-compounds are prepared in the same way starting from 1-pregnene-11β,17α,21-triol-3,20-dione 21-acetate.

The particular importance of VII, VIII and the related 11β-hydroxy-compounds is that upon treatment with an acid or base such as alumina, Triton B, etc., the oxygenated substitutent at 1- is eliminated readily affording the powerful antiarthritic, $\Delta^{1,4}$-diene-3-one compounds. Furthermore, the 1-oxygenated derivatives possess adrenocortical properties and are useful in the therapy of arthritis and other afflictions known to respond to the adrenocortical hormones.

EXAMPLES

*1,2 - oxidopregnane-17α,21-diol-3,11,20-trione 21-acetate.*—To a solution of 0.4 g. of 1-pregnene-17α,21-diol-3,11,20-trione 21-acetate in 100 ml. of chloroform at 5° C. is added 0.14 g. of perbenzoic acid in 25 ml. of chloroform. The resulting mixture is allowed to stand at 5° C. overnight and is then washed with dilute aqueous sodium bicarbonate. The chloroform solution is then dried and concentrated in vacuo. The residue is crystallized from acetone-hexane affording crystalline 1,2-oxidopregnane-17α,21-diol-3,11,20-trione 21-acetate.

*2-bromopregnane-1,17α,21-triol-3,11,20-trione 21-acetate.*—To a solution of 0.42 g. of 1,2-oxidopregnane-17α,21-diol-3,11,20-trione 21-acetate in 100 ml. of chloroform at 5° C. is added 0.08 g. of anhydrous hydrogen bromide dissolved in 100 ml. of chloroform. The mixture is allowed to stand at 5° C. for one hour and is then concentrated in vacuo. The residue is crystallized from methylene chloride-hexane affording crystalline 2-bromopregnane-1,17α,21-triol-3,11,20-trione 21-acetate.

*Pregnane-1,17α,21-triol-3,11,20-trione 21 - acetate.*—A solution of 1 g. of 2-bromopregnane-1,17α,21-triol-3,11,20-trione 21-acetate in 100 ml. of methanol is shaken with 10 g. of 10% palladium-on-calcium carbonate catalyst in an atmosphere of hydrogen at atmospheric pressure. After one equivalent of hydrogen has been taken up (several hours shaking), the catalyst is filtered from the solution and the filtrate is concentrated in vacuo to a solid residue, pregnane-1,17α,21-triol-3,11,20-trione 21-acetate.

*Pregnane-1,17α,21-triol-3,11,20-trione 1,21-diacetate.*—The crude product from the preceding experiment is dissolved in a mixture of 0.5 ml. of acetic anhydride and 5 ml. of pyridine. The reaction is allowed to proceed overnight and then the mixture is diluted with ice-water. The resulting precipitate is filtered and recrystallized from methylene chloride-hexane affording crystalline pregnane-1,17α,21-triol-3,11,20-trione 1,21-diacetate.

*4-bromopregnane-1,17α,21-triol - 3,11,20 - trione 1,21-diacetate.*—To a solution of 0.46 g. of pregnane-1,17α,21-triol-3,11,20-trione 1,21-diacetate in 50 ml. of glacial acetic acid is added 0.5 ml. of 0.28 N hydrogen bromide in acetic acid. Then there is added dropwise with good agitation a solution containing 0.16 g. of bromine, 0.08 g. of sodium acetate and 15 ml. of glacial acetic acid at such a rate that each drop has the opportunity to react before another is added. When addition is complete the reaction mixture is diluted with five volumes of water and the precipitated 4-bromopregnane-1,17α,21-triol-3,11,20-trione 1,21-diacetate is collected by filtration.

*4-pregnene-1,17α,21-triol-3,11,20 - trione 1,21 - diacetate.*—To a solution of 0.54 g. of 4-bromopregnane-1,17α,21-triol-3,11,20-trione 1,21-diacetate in 50 ml. of glacial acetic acid is added, under an atmosphere of carbon dioxide, a solution containing 0.25 g. of semicarbazide hydrochloride, 180 mg. of anhydrous sodium acetate, 10 ml. of water and 10 ml. of glacial acetic acid. The mixture is agitated for ten minutes and there is then added 20 ml. of 1 N sodium acetate in glacial acetic acid. Agitation is continued for 10 minutes longer, 2 ml. of pyruvic acid is added and the mixture is refluxed for ten minutes. The cooled solution is diluted with water and extracted with methylene chloride. The extracts are washed free of acid with water and the solution is dried over magnesium sulfate. Concentration of the dry solution and addition of hexane induces crystallization of 4-pregnene-1,17α,21-triol-3,11,20-trione 1,21-diacetate.

Pregnane-1,17α,21-triol-3,11,20-trione 21-acetate may be brominated and dehydrobrominated by the procedure described in the previous two examples, affording crystalline 4-pregnene-1,17α,21-triol-3,11,20-trione 21-acetate.

*1,2-oxidopregnane-11-β,17α,21-triol-3,20-dione 21-acetate.*—To a solution of 0.4 g. of 1-pregnene-11β,17α,21-triol-3,20-dione 21-acetate in 100 ml. of chloroform at 5° C. is added 0.14 g. of perbenzoic acid in 25 ml. of chloroform. The resulting mixture is allowed to stand at 5° C. overnight and is then washed with dilute aqueous sodium bicarbonate. The chloroform solution is then dried and concentrated in vacuo. The residue is crystallized from acetone-hexane affording crystalline 1,2-oxidopregnane-11β,17α,21-triol-3,20-dione 21-acetate.

*2-bromopregnane-1,11β,17α,21-tetrol - 3,20 - dione 21-acetate.*—To a solution of 0.42 g. of 1,2-oxidopregnane-11β,17α,21-triol-3,20-dione 21-acetate in 100 ml. of chloroform at 5° C. is added 0.08 g. of anhydrous hydrogen bromide dissolved in 100 ml. of chloroform. The mixture is allowed to stand at 5° C. for one hour and is then concentrated in vacuo. The residue is crystallized from methylene chloride-hexane affording crystalline 2-bromopregnane-1,11β,17α,21-tetrol-3,20-dione 21-acetate.

*Pregnane-1,11-β,17α,21-tetrol-3,20-dione 21-acetate.*—A solution of 1 g. of 2-bromopregnane-1,11-β,17-α,21-tetrol-3,20-dione 21-acetate in 100 ml. of methanol is shaken with 10 g. of 10% palladium-on-calcium carbonate catalyst in an atmosphere of hydrogen at atmospheric pressure. After one equivalent of hydrogen has been taken up (several hours shaking), the catalyst is filtered from the solution and the filtrate is concentrated in vacuo to a solid residue of pregnane-1,11-β,17-α,21-tetrol-3,20-dione 21-acetate.

*Pregnane-1,11-β,17-α,21-tetrol-3,20 - dione 1,21-diacetate.*—The crude product from the preceding example is dissolved in a mixture of 0.5 ml. of acetic anhydride and 5 ml. of pyridine. The reaction is allowed to proceed overnight and then the mixture is diluted with ice-water. The resulting precipitate is filtered and recrystallized from methylene chloride-hexane affording crystalline pregnane-1,11β,17α,21-tetrol-3,20-dione 1,21-diacetate.

*4-bromopregnane-1,11β,17α,21-tetrol-3,20 - dione 1,21-diacetate.*—To a solution of 0.46 g. of pregnane-1,11β,17α,21-tetrol-3,20-dione 1,21-diacetate in 50 ml. of glacial acetic acid is added 0.5 ml. of 0.28 N hydrogen bromide in acetic acid. Then there is added dropwise with good agitation a solution containing 0.16 g. of bromine, 0.08 g. of sodium acetate and 15 ml. of glacial acetic acid at such a rate that each drop has the opportunity to react before another is added. When addition is complete the reaction mixture is diluted with five volumes of water and the precipitated 4-bromopregnane-1,11β,17α,21-tetrol-3,20-dione 1,21-diacetate is collected by filtration.

*4-pregnene-1,11β,17α,21-tetrol-3,20-dione 1,21 - diacetate.*—To a solution of 0.54 g. of 4-bromopregnane-1,11β,17α,21-tetrol-3,20-dione 1,21-diacetate in 50 ml. of glacial acetic acid is added, under an atmosphere of carbon dioxide, a solution containing 0.25 g. of semicarbazide hydrochloride, 180 mg. of anhydrous sodium acetate, 10 ml. of water and 10 ml. of glacial acetic acid. The mixture is agitated for ten minutes and there is then added 20 ml. of 1 N sodium acetate in glacial acetic acid. Agitation is continued for 10 minutes longer, 2 ml. of pyruvic acid is added and the mixture is refluxed for ten mintues. The cooled solution is diluted with water and extracted with methylene chloride. The extracts are washed free of acid with water and the solution is dried over magnesium sulfate. Concentration of the dry solution and addition of hexane induces crystallization of 4-pregnene-1,11β,17α,21-tetrol-3,20-dione 1,21-diacetate.

Pregnane-1,11β,17α,21-tetrol-3,20-dione 21-acetate may be brominated and dehydrobrominated by the procedure described in the previous two examples, affording crystalline 4-pregnene-1,11β,17α,21-tetrol-3,20-dione 21-acetate.

*Elimination of the 1-hydroxyl group with alumina.*—A solution of 0.1 g. of 4-pregnene-1,11β,17α,21-tetrol-3,20-dione 21-acetate in 100 ml. of chloroform is passed over an activated alumina (30 g. of 100–200 mesh) column and the column is then washed with methanol. The combined eluates are concentrated and the residue, which crystallizes from acetone, is identical in all respects with 1,4-pregnadiene-11β,17α,21-triol-3,20-dione 21-acetate.

A solution of 0.1 g. of 4-pregnene-1,17α,21-triol-3,11,-20-trione 21-acetate in 100 ml. of chloroform is passed over an activated alumina (30 g. of 100–200 mesh) column and the column is then washed with methanol. The combined eluates are concentrated and the residue, which crystallizes from acetone, is identical in all respects with 1,4-pregnadiene-17α,21-diol-3,11,20-trione 21-acetate.

I claim:
1. Compounds of the formula

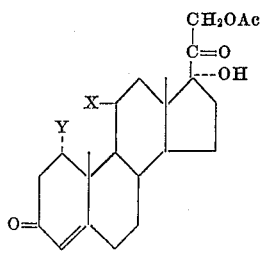

wherein X is selected from

and =O, Y is selected from —OH and —OAc, and Ac represents a lower alkanoic acid radical.

2. 4 - pregnene - 1,17α,21 - triol - 3,11,20 - trione 1,21-diacetate.
3. 4 - pregnene - 1,11β,17α,21 - tetrol - 3,20 - dione 1,21-diacetate.
4. 4 - pregnene - 1,17α,21 - triol - 3,11,20 - trione 21-acetate.
5. 4 - pregnene - 1,11β,17α,21 - tetrol - 3,20 - dione 21-acetate.
6. The method of making 1-oxygenated steroid compounds of the formula

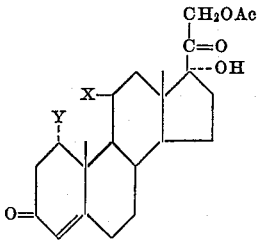

wherein X is selected from

and =O, Y is selected from —OH and —OAc, and Ac represents a lower alkanoic acid radical which comprises successively brominating in the 4-position and debrominating a compound of the formula

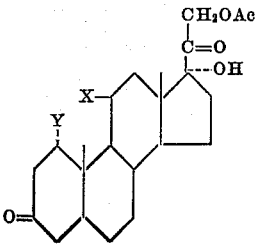

7. The method of making 1-oxygenated steroid compounds of the formula

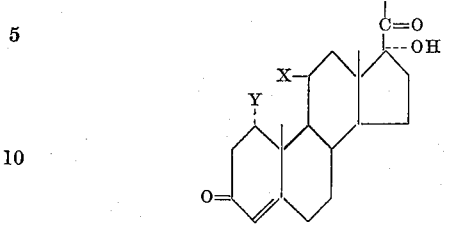

wherein X is selected from

and =O, Y is selected from —OH and —OAc, and Ac represents a lower alkanoic acid radical which comprises dehalogenating a compound of the formula

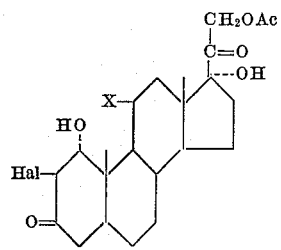

wherein Hal is selected from bromine and iodine, and successively brominating in the 4-position and debrominating the resulting compound.

8. Compounds as defined in claim 1 wherein X is

and Y is —OAc.

9. Compounds as defined in claim 1 wherein X is =O and Y is —OAc.

10. Compounds as defined in claim 1 wherein X is

and Y is —OH.

11. Compounds as defined in claim 1 wherein X is =O and Y is —OH.

References Cited in the file of this patent
UNITED STATES PATENTS

| | | |
|---|---|---|
| 2,380,483 | Wagner | July 31, 1945 |
| 2,673,867 | Spero | Mar. 30, 1954 |
| 2,715,640 | Ralls | Aug. 16, 1955 |

FOREIGN PATENTS

| | | |
|---|---|---|
| 1,056,878 | France | Oct. 28, 1953 |